US006427644B1

(12) United States Patent
Dabadie et al.

(10) Patent No.: US 6,427,644 B1
(45) Date of Patent: Aug. 6, 2002

(54) CONTROLLED SELF-IGNITION COMBUSTION PROCESS AND ASSOCIATED FOUR-STROKE ENGINE WITH TRANSFER LINE BETWEEN CYLINDERS AND DEDICATED VALUE

(75) Inventors: Jean-Charles Dabadie, Rueil-Malmaison; Jacques Lavy, Guillancourt, both of (FR)

(73) Assignee: Institut Francais du Petrole, Rueil-Malmaison (FR)

( * ) Notice: Subject to any disclaimer, the term of this patent is extended or adjusted under 35 U.S.C. 154(b) by 0 days.

(21) Appl. No.: 09/299,085

(22) Filed: Apr. 26, 2999

(30) Foreign Application Priority Data

Apr. 27, 1998 (FR) ........................................... 98 05925

(51) Int. Cl.[7] ............................................... F02M 25/06

(52) U.S. Cl. ..................................................... 123/58.8

(58) Field of Search ............................... 123/58.8, 58.7

(56) References Cited

U.S. PATENT DOCUMENTS

| | | | | | |
|---|---|---|---|---|---|
| 4,041,910 | A | * | 8/1977 | Houseman | 123/58.8 |
| 4,109,625 | A | * | 8/1978 | Kawamura et al. | 123/568.13 |
| 4,156,414 | A | * | 5/1979 | Kawamura et al. | 123/568.2 |
| 4,159,700 | A | * | 7/1979 | McCrum | 123/58.8 |
| 4,175,522 | A | * | 11/1979 | Kawamura et al. | 123/568.2 |
| 4,194,472 | A | * | 3/1980 | Amano et al. | 123/58.8 |
| 4,237,832 | A | * | 12/1980 | Hartig et al. | 123/58.8 |
| 4,506,633 | A | * | 3/1985 | Britsch | 123/58.8 |

FOREIGN PATENT DOCUMENTS

| | | | |
|---|---|---|---|
| DE | 4036537 | 11/1991 | F02M/25/07 |
| EP | 0426320 | 5/1991 | F02B/1/02 |
| FR | 2078819 | 11/1971 | F02M/25/00 |

* cited by examiner

*Primary Examiner*—Noah P. Kamen
*Assistant Examiner*—Jason Benton
(74) *Attorney, Agent, or Firm*—Antonelli, Terry, Stout & Kraus, LLP

(57) ABSTRACT

The present invention relates to a controlled self-ignition combustion process in a four-stroke engine having plural cylinders (1) having each at least a first intake (2) and at least a first exhaust (3). The process according to the invention during partial load operation, transfers, via at least one additional port (4) of each cylinder and an exhaust gas transfer, exhaust gases from a cylinder in the exhaust phase to another cylinder in the intake phase. The present invention further relates to a multicylinder four-stroke engine working on controlled self-ignition, allowing implementation of the above-described process.

32 Claims, 2 Drawing Sheets

CONTROLLED SELF-IGNITION COMBUSTION PROCESS AND ASSOCIATED FOUR-STROKE ENGINE WITH TRANSFER LINE BETWEEN CYLINDERS AND DEDICATED VALUE

BACKGROUND OF THE INVENTION

1. Field of the Invention

The present invention relates to controlled self-ignition four-stroke internal-combustion engines.

2. Description of the Prior Art

Controlled self-ignition is a well-known phenomenon in two-stroke engines. This combustion type has advantages as regards emissions: low hydrocarbon and nitrogen oxide emissions are notably obtained. Furthermore, a remarkable cycle regularity is achieved during self-ignition combustion.

Self-ignition is a phenomenon that allows to initiation of combustion by means of residual burned gases which remain in the combustion chamber after combustion.

Self-ignition is achieved by controlling the amount of residual gases and the mixing thereof with the fresh gases (unburned). The residual gases (hot burned gases) initiate the combustion of the fresh gases thanks to a combination of temperature and of presence of active species (radicals).

In two-stroke engines, the presence of residual gases is <<inherent>> in the combustion. In fact, when the load of the engine decreases, the amount of fresh gases decreases, which leads to an increase in the amount of residual gases (burned gases from the previous cycle or cycles which have not flowed out of the cylinder). The two-stroke engine thus works with an internal recirculation (or internal EGR) of the burned gases at partial load. However, the presence of this internal EGR is not sufficient to obtain the desired self-ignition running. Research work also shows that mixing of this internal EGR and of the fresh gases has to be controlled and limited.

The controlled self-ignition technology applied to four-stroke engines is particularly interesting because it allows the engine to run with an extremely diluted mixture, with very low fuel/air ratios and ultra-low NOx emissions.

However, this technology comes up against a significant technological difficulty insofar as, in order to obtain it without the internal EGR effect of the two-stroke engine, it is necessary to either significantly increase the compression ratio of the engine (with knocking problems at high load), or to considerably heat up the fresh gases admitted (several hundred degrees C), or to combine these two phenomena.

Solutions allowing decreasing pressure and temperature level requirements for four-stroke engines can be partly provided by suitable additives in the fuel. French patent 2,738,594 illustrates a solution of this type.

It is well-known for four-stroke engines, for example from international patent application PCT WO-93/16,276, to combine a variable distribution adjustment with a non-return system at the intake in order to reduce pumping losses at partial load. This solution then allows operation with the intake throttle as wide open as possible.

French patent application EN.97/02,822 of the assignee describes a way of controlling self-ignition in a four-stroke engine. More precisely, this document recommends, at partial load, to minimize mixing of the fresh gases and of the burned gases trapped in the combustion chamber by delaying closing of the exhaust as much as possible. This is an <<internal>> recycle that allows stratification of the gases in the combustion chamber.

Patent application EN.97/11,279 of the assignee also aims to minimize, at partial load, mixing of the fresh gases and of the burned gases contained in the combustion chamber, in order to control and to favour self-ignition combustion. However, this prior art proposes transferring the burned gases from the exhaust to the intake via a specific line opening into an air supply line just upstream from the combustion chamber. The fresh air-fuel feed is introduced separately and late via a second line. A successive introduction of the feeds is thus provided.

However, this solution creates a substantial dilution of the recycled burned gases, by air, prior to entering the combustion chamber, which may pose problems.

SUMMARY OF THE INVENTION

The present invention provides very simple and reliable controlled self-ignition in mullticylinder four-stroke engines, which is easy to implement and best favours stratification of the burned gases in the combustion chamber. Furthermore, the burned gases retain, according to the invention, their temperature, which is favorable to spontaneous combustion.

The present invention thus provides a controlled self-ignition combustion process in a four-stroke internal-combustion engine comprising several cylinders having each at least a first intake and at least a first exhaust.

According to the invention, the process consists, during part-load operation, in transferring, via at least one specific port of each cylinder and a suitable exhaust gas transfer, exhaust gases from a cylinder in the exhaust phase to another -cylinder in the intake phase.

The process according to the invention further controls the distribution of the flow of exhaust gases between the first exhaust and the exhaust gas transfer.

Furthermore, the process can thermally insulate and/or heat the exhaust gases transferred in the exhaust gas transfer, in order to improve self-ignition even further.

Furthermore, at partial load, an additional port is opened at a time close to the opening of the first exhaust means and a port is closed at a time close to the closing of the first intake.

According to an embodiment of the invention, a common line is used for the exhaust gas transfer.

More particularly, at full and high loads, the common line and at least some of the additional ports are used to introduce a feed or to discharge exhaust gases.

According to another embodiment of the invention, a set of lines connecting the cylinders in groups of two is used for exhaust gas transfer from cylinder to cylinder.

The present invention also relates to a four-stroke internal-combustion engine working on the controlled self-ignition principle and comprising several cylinders having each at least a first intake and at least a first exhaust.

According to the invention, each cylinder further comprises at least one additional port allowing passage of the exhaust gases from a cylinder in the exhaust phase to another cylinder in the intake phase, as well as an associated exhaust gas transfer, during part-load operation.

A device providing thermal insulation and/or heating of the exhaust gas can also be provided without departing from the scope of the invention.

The engine also advantageously comprises an exhaust gas distributor which distributes the exhaust gases between the first exhaust and the exhaust gas transfer additional ports, at partial load.

The exhaust gas distributor can comprise either a first throttling device placed close to the first exhaust, or a second throttling device placed near the exhaust gas transfer, or both throttling devices.

According to an embodiment, the exhaust gas comprises a common line opening into each additional port.

The common line advantageously also comprises a port into which a line provided with a gas flow control opens.

According to another embodiment of the invention, the exhaust gas transfer means comprises a set of lines connecting the cylinders in groups of two.

BRIEF DESCRIPTION OF THE DRAWINGS

Other features, details and advantages of the present invention will be clear from reading the description hereafter, given by way of non limitative example, with reference to the accompanying drawings wherein.

DETAILED DESCRIPTION OF THE INVENTION

Figure 1:
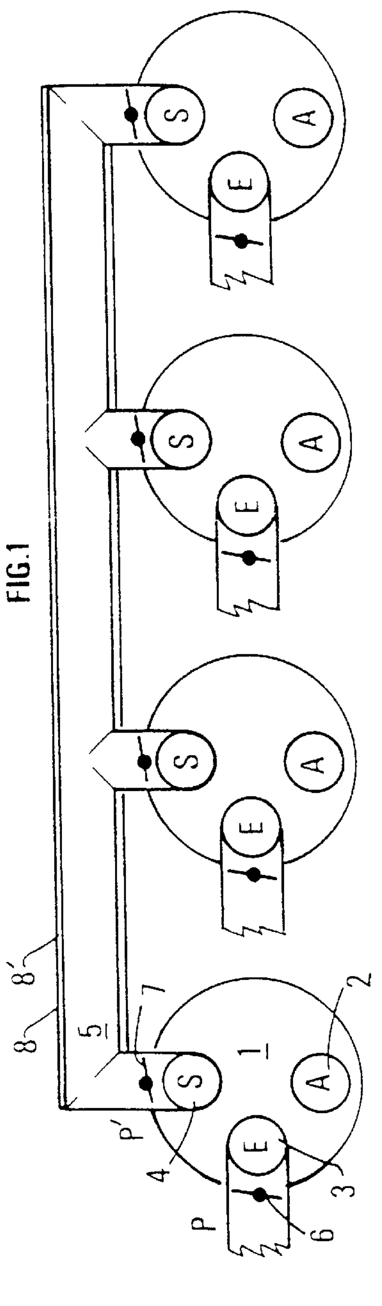
FIG. 1 is a diagrammatic section of an embodiment of the invention.

FIG. 1 illustrates the case of an engine comprising four cylinders 1. In fact, the invention applies to all engines comprising at least two cylinders.

Each cylinder 1 comprises at least a first feed intake 2. The term <<feed intake 2 >> refers to an intake port with which a valve is associated.

Furthermore, each cylinder comprises a first exhaust 3 conventionally having an exhaust port and of an associated valve.

Besides, each cylinder 1 comprises an additional port 4 into which an exhaust gas transfer line opens. A valve cooperates with the additional port 4.

In each cylinder, a first throttling device 6 is placed close to first exhaust 3, whereas a second throttling device 7 is placed close to the additional port 4. Suitable and coordinated control of the opening of each throttling throttling devices 6,7 allow adjustment and distribution of the flow of gas between the conventional exhaust 3 and additional port 4.

A single throttling device can be provided without departing from the scope of the invention.

Each cylinder thus comprises at least one additional port 4 that cooperates with a valve. It can comprise several ones. It is the same for the intake and exhaust.

The additional ports 4 are connected to the exhaust gas transfer pipes permitting the exhaust gases or another fluid to pass therethrough when transferred from one cylinder to another cylinder.

More precisely, at partial load, exhaust gases are transferred from a cylinder in the exhaust phase to another cylinder in the intake phase.

The table hereunder illustrates the transfers thus achieved during a cycle, for a four-stroke engine.

| CYLINDER 1 | CYLINDER 2 | CYLINDER 3 | CYLINDER 4 |
|---|---|---|---|
| D | E | C | A |
| E → | A | D | C |
| A | C | E | D |
| C | D | A | ← E |

D = expansion; E = exhaust; A = intake; C = compression.

In other words, an exhaust gas transfer pipe 8 splits in two parts at the additional ports 4 of given cylinders: one part ends at the additional port 4 of a cylinder lagging in phase and it allows transfer of exhaust gas from the leading cylinder to the cylinder lagging in phase; the second part ends at the cylinder leading in phase and it allows transfer of the exhaust gases from the cylinder leading in phase to the cylinder lagging in.

If the cylinders each have several additional ports 4, a pipe linked with a cylinder lagging in phase will end in at least one of the additional ports, and a pipe linked with a cylinder leading in phase will end in at least one of the other additional port(s).

Figure 2:
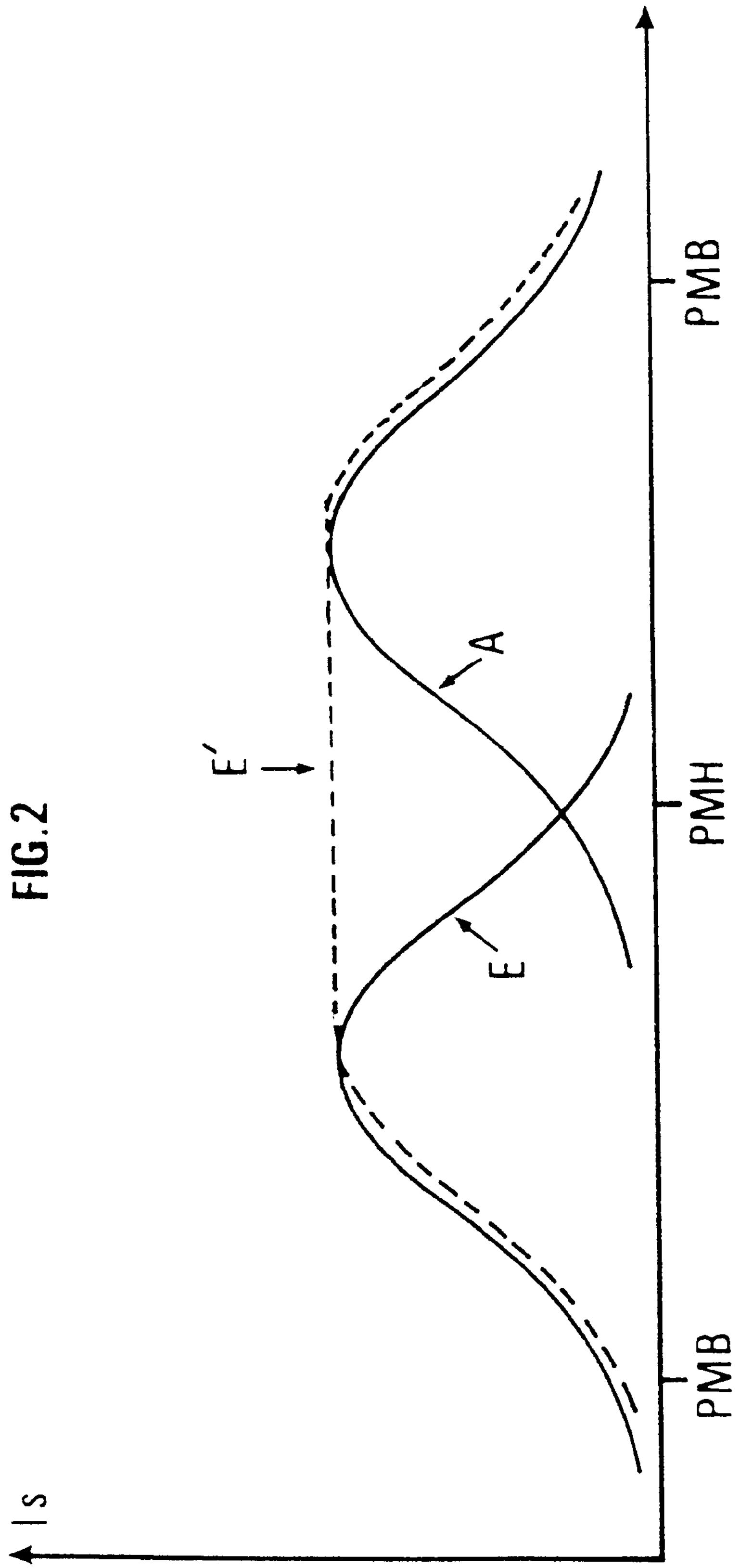
FIG. 2 is a graph giving the law of lifting of the valves in a cycle.

The lifting law of the valves in a given cylinder can be that of FIG. 2: exhaust valve 3 follows curve E, intake valve 2 follows curve A and the additional valve 4 follows curve E', i.e. it opens at the same time as the exhaust valve but it closes only when the intake valve closes. This allows the transfer from cylinder to cylinder according to the invention to be obtained.

Figure 3:
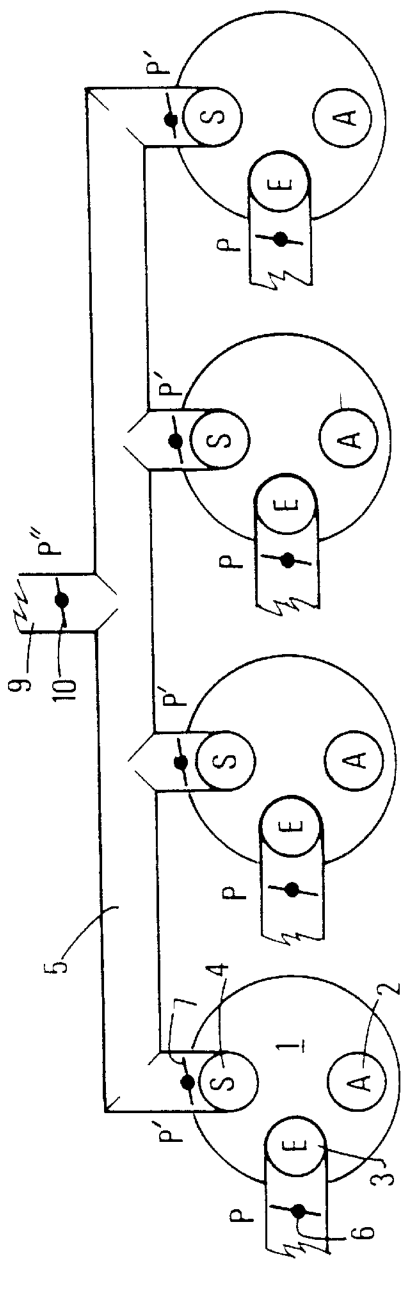
FIG. 3 is a diagrammatic section of another embodiment of the invention.

According to an embodiment of the invention illustrated by FIGS. 1 or 3, the exhaust gas transfer comprises a common line 5 opening into each additional port 4.

An exhaust gas such as a set of lines connecting the cylinders in groups of two and allowing for example for a four-stroke engine to obtain the transfers shown in the table above can also be provided without departing from the scope of the invention.

Transfer pipe(s) 5 can be advantageously thermally insulated by a ceramic 8 for example and heated by heater 8'. The gases flowing through a transfer pipe 5 thus do not lose and may even gain heat when they reach the cylinder. Self-ignition is thus improved since it is well-known that the temperature of the recycled gases is an important parameter favoring self-ignition.

FIG. 3 illustrates another embodiment of the invention differing from that of FIG. 1 in the addition of a pipe 9 opening into common pipe 5. A throttling device 10 is preferably provided in pipe 9, close to the area where it opens into common pipe 5.

At partial load, the system works as explained above. At full load, the lift law of valve 4 can be that of the intake valve (curve A in FIG. 2) with throttling device 10 in open position: this ensures optimum filling of the cylinders.

The lift law of valve 4 can also be, at full load, the same as that of the exhaust valve (curve E in FIG. 2), with throttling device 10 open in order to ensure optimum discharge of exhaust from the engine. In other words, according to this embodiment of the invention, each additional valve 4 is used at full load either as an intake valve or as an exhaust valve. This feature thus improves combustion during this operating phase. Of course, at partial load, throttling device 10 is closed so that the operating mode is the same as that described in connection with FIG. 1.

It can be noted that the throttling device 10 is a totally optional in the embodiment of FIG. 1 because it mainly allows improved full-load running.

What is claimed is:

1. A self-ignition process in a four-stroke engine having a plurality of cylinders with each cylinder having at least one intake including an intake port, at least one exhaust including an exhaust port and at least one additional port and an exhaust gas transfer coupling together the additional ports of a plurality of the plurality of cylinders comprising:

during operation in a self-ignition mode at partial load, transferring exhaust gas from at least one cylinder during an exhaust phase to at least one other cylinder during an intake phase by transfer from the at least one cylinder, through at least one of the additional ports, the exhaust gas transfer, at least another one of the additional ports and into the at least one other cylinder with the transferred exhaust gas having a temperature promoting spontaneous combustion in the at least one other cylinder.

2. A process as claimed in claim 1, further comprising:

controlling distribution of a flow of the exhaust gas between the at least one intake and the at least one additional port.

3. A process as claimed in claim 1, further comprising:

thermally insulating the exhaust gas during transfer by the exhaust gas transfer.

4. A process as claimed in claim 2, further comprising:

thermally insulating the exhaust gases during transfer by the exhaust gas transfer.

5. A process in accordance with claim 1 further comprising:

heating the exhaust gas during transfer by the exhaust gas transfer.

6. A process in accordance with claim 2 further comprising:

heating the exhaust gas during transfer by the exhaust gas transfer.

7. A process in accordance with claim 3 further comprising:

heating the exhaust gas during transfer by the exhaust gas transfer.

8. A process in accordance with claim 4 further comprising:

heating the exhaust gas during transfer by the exhaust gas transfer.

9. A process as claimed in claim 1, further comprising:

at partial load, opening at least one additional port in a timed relation to opening of at least one exhaust port and closing at least one additional port in a timed relation to closing of at least one intake port.

10. A process as claimed in claim 2, further comprising:

at partial load, opening at least one additional port in a timed relation to opening of at least one exhaust port and closing at least one additional port in a timed relation to closing of at least one intake port.

11. A process as claimed in claim 3, further comprising:

at partial load, opening at least one additional port in a timed relation to opening of at least one exhaust port and closing at least one additional port in a timed relation to closing of at least one intake port.

12. A process as claimed in claim 4, further comprising:

at partial load, opening at least one additional port in a timed relation to opening of at least one exhaust port and closing at least one additional port in a timed relation to closing of at least one intake port.

13. A process as claimed in claim 5, further comprising:

at partial load, opening at least one additional port in a timed relation to opening of at least one exhaust port and closing at least one additional port in a timed relation to closing of at least one intake port.

14. A process as claimed in claim 6, further comprising:

at partial load, opening at least one additional port in a timed relation to opening of at least one exhaust port and closing at least one additional port in a timed relation to closing of at least one intake port.

15. A process as claimed in claim 7, further comprising:

at partial load, opening at least one additional port in a timed relation to opening of at least one exhaust port and closing at least one additional port in a timed relation to closing of at least one intake port.

16. A process as claimed in claim 8, further comprising:

at partial load, opening at least one additional port in a timed relation to opening of at least one exhaust port and closing at least one additional port in a timed relation to closing of at least one intake port.

17. A process as claimed in claim 1, wherein:

the exhaust gas transfer is a pipe connected to all of the additional ports.

18. A process as claimed in claim 17 wherein:

at full load, at least one of the additional ports and the pipe feeds or discharges exhaust gases.

19. A process as claimed in claim 1, wherein:

the exhaust gas transfer connects the cylinders in groups of two for exhaust gas transfer from cylinder to cylinder.

20. A four-stroke self-ignition internal combustion engine comprising:

a plurality of cylinders each having at least one intake including an intake port, at least one exhaust including an exhaust port, and at least one additional port; and an exhaust gas transfer coupling together the additional ports of a plurality of the cylinders which during operation of the engine in the self-ignition mode at partial load transfers exhaust gas from at least one cylinder during an exhaust gas phase to at least one other cylinder during an intake phase by transfer from the at least one cylinder, through at least one of the additional ports, the exhaust gas transfer, at least another one of the additional ports and into the at least one other cylinder with the transferred exhaust gas having a temperature promoting spontaneous combustion in the at least one other cylinder.

21. An internal combustion engine as claimed in claim 20, further comprising:

thermal insulation of the exhaust gas transfer.

22. An internal combustion engine in accordance with claim 20, further comprising:

a heater which heats the exhaust gas transfer.

23. An internal combustion engine in accordance with claim 21, further comprising:

a heater which heats the exhaust gas transfer.

24. An internal combustion engine as claimed in claim 20, further comprising:

at least one distributor within the exhaust gas transfer which controls exhaust gas flow at partial load between the additional ports.

25. An internal combustion engine as claimed in claim 21, further comprising:

at least one distributor within the exhaust gas transfer which controls exhaust gas flow at partial load between the additional ports.

26. An internal combustion engine as claimed in claim 22, further comprising:

at least one distributor within the exhaust gas transfer which controls exhaust gas flow at partial load between the additional ports.

27. An internal combustion engine as claimed in claim 23, further comprising:

at least one distributor within the exhaust gas transfer which controls exhaust gas flow at partial load between the additional ports.

28. An internal combustion engine as claimed in claim 24, wherein:

the at least one gas distributor comprises at least one first throttle placed proximate the exhaust port.

29. An internal combustion engine as claimed in claim 28, wherein:

the at least one distributor comprises at least one second throttle placed proximate to at least one additional port.

30. An internal combustion engine as claimed in claim 20 wherein:

the exhaust gas transfer comprises a pipe opening into all of the additional ports.

31. An internal combustion engine as claimed in claim 30, wherein:

the pipe comprises a port which opens into a pipe having gas flow control.

32. An internal combustion engine as claimed in claim 20 wherein:

the exhaust gas transfer connects the cylinders in groups of two.

* * * * *